March 5, 1957 A. F. NAYLOR 2,783,941

COMPUTING DEVICES

Filed June 30, 1950

INVENTOR
ARTHUR F. NAYLOR
BY Morris L. Rabkin
ATTORNEY

United States Patent Office 2,783,941

Patented Mar. 5, 1957

2,783,941

COMPUTING DEVICES

Arthur F. Naylor, Haddonfield, N. J., assignor to Radio Corporation of America, a corporation of Delaware Application June 30, 1950, Serial No. 171,413

11 Claims. (Cl. 235—61)

Figure 1:
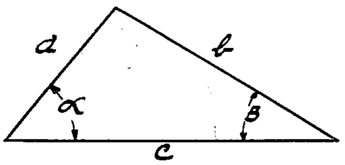

This invention relates to computers. More particularly the present invention is an improvement in computers used for solving simultaneous equations.

One form of navigation, as presently practiced, is the one in which two radio transmitting and receiving stations, whose distance apart is known, transmit information to a moving vehicle by means of which its distance to each of the two stations is determined. The pilot of the vehicle is thus provided with information as to the lengths of three sides of a triangle whose apices are defined by the vehicle and the positions of the two transmitting stations. To best utilize the position of the vehicle relative to the two transmitting stations at least one angle and preferably two angles of the triangle are often required. A computer is therefore required which can solve the problem presented, namely, the determination of two angles of a triangle given information as to the lengths of three of the sides. Alternatively stated, the computer must be of the type which solves for the values of $\alpha$ and $\beta$ in the two simultaneous equations $$a \sin \alpha - b \sin \beta = 0$$
$$a \cos \alpha + b \cos \beta - c = 0$$

where $a$, $b$ and $c$ are the three sides of a triangle, the known quantities, and $\alpha$ and $\beta$, the unknown quantities, are respectively the angles opposite sides $b$ and $a$.

It is an object of the present invention to provide a novel computer that can solve for two angles of a triangle from information as to the lengths of three of its sides.

The invention contemplated herein is of the general type wherein a function generator may be provided for each of the simultaneous equations. The known information is applied to each function generator which provides outputs which are combined in a manner indicated by the simultaneous equations. In the absence of a solution, error signals are obtained from the combined outputs which may be fed back to the respective function generators to control them in a fashion to reduce the error signals to zero. In view of the feedback, maintenance of complete stability of the computer presents a serious obstacle to the general utilization of these types of computers.

It is a further object of the present invention to provide an improved computer which has error voltage control feedback and is stable.

It is still another object of the present invention to provide an improved, stable computer having a novel type of error voltage control feedback.

These and other objects of the present invention are achieved by providing a pair of angle resolvers upon each of which a voltage, proportional to the length of a different one of the sides of the triangle to be solved, is impressed. Each angle resolver provides two outputs. These outputs are combined algebraically in one case and combined algebraically to be subtracted from a voltage proportional to the third side of the triangle in the other case. The resultant of these combinations are two error signals. These are added and also subtracted. The added error signals are used to control the rotor position of one angle resolver and the subtracted error signals are used to control the rotor position of the other angle resolver. These angle resolver rotors are turned responsive to the error control signals in a manner to reduce the error signals to substantially zero. At this time the rotors of the angle resolvers make angles referred to a reference position which are equal to the required base angles.

Figure 2:
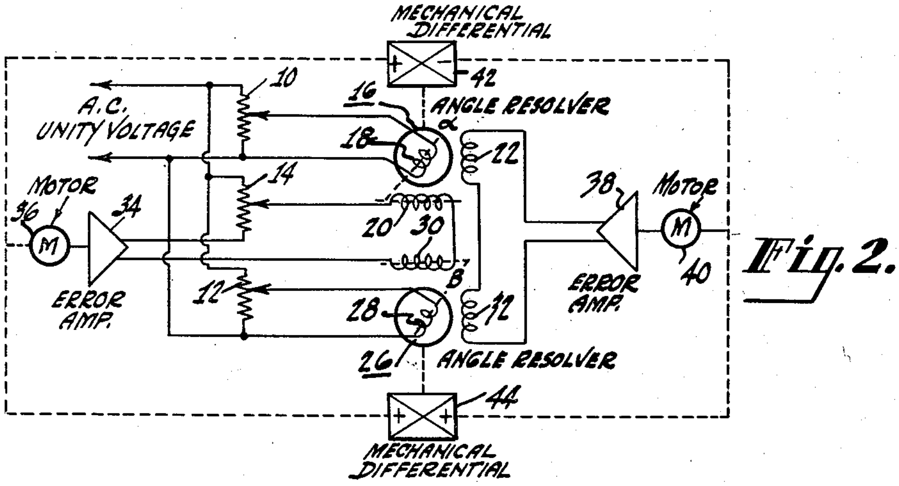
Figure 3:
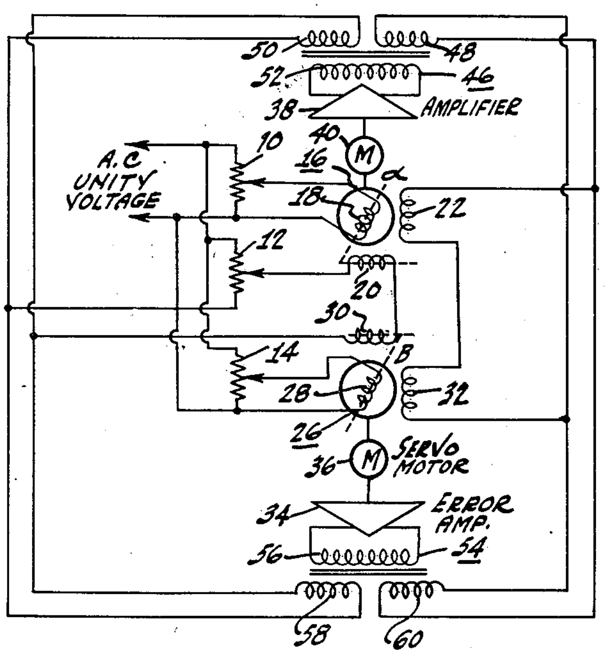

The novel features of the invention as well as the invention itself, both as to its organization and method of operation, will best be understood from the following description when read in connection with the accompanying drawings in which Figure 1 is a diagram of a triangle which shows the geometry of the problem to be solved, Figure 2 is a circuit diagram of one embodiment of the invention, and Figure 3 is a circuit diagram of a second embodiment of the invention.

Referring now to Figure 1, there may be seen a triangle having sides $a$, $b$ and $c$ with the angle $\alpha$ being included between sides $a$ and $c$ and with the angle $\beta$ included between sides $b$ and $c$.

It may readily be shown that $$a \sin \alpha - b \sin \beta = 0 \quad (1)$$

$$a \cos \alpha + b \cos \beta - c = 0 \quad (2)$$

If $a$, $b$ and $c$ are known, then a solution for the angles $\alpha$ and $\beta$ may be obtained. In the general type of computer used to solve these equations a function generator is usually used for each equation and the function generator outputs are used to provide an error signal for each equation which is fed back to the function generator. The feedback is done in such a way as to drive the function generator to reduce the error signal to zero and thus provide a solution. At times, other than when the error signals are zero, the right hand members of the two equations are not equal to zero but to the error voltages $E_1$ and $E_2$ respectively. The equations then take the form:

$$a \sin (\alpha + \Delta\alpha) - b \sin (\beta + \Delta\beta) = E_1 \quad (3)$$

$$a \cos (\alpha + \Delta\alpha) + b \sin (\beta + \Delta\beta) - c = E_2 \quad (4)$$

where $\Delta\alpha$ and $\Delta\beta$ are the respective differences between the angles existing in the computers and the true angles $\alpha$ and $\beta$.

To see that a question of stability exists, suppose $E_1$ and $E_2$ are used directly to drive $\alpha$ and $\beta$ respectively. Suppose further that $\alpha$ is correct at a certain instant, i. e., $\Delta\alpha$ is equal to zero and $\Delta\beta$ is incorrect, i. e., $\Delta\beta$ is not equal to zero. Then both equations are unbalanced, since each is a function of the incorrect $\Delta\beta$. Thus, neither $E_1$ nor $E_2$ is zero. The non-zero $E_1$ then drives $\alpha$ off of its correct value temporarily. $E_1$ may thus be increased again. $\alpha$ may settle back to its correct value as $\beta$ settles back to its correct value, but it can be seen that there is some doubt as to the stability of the system wherein a drive is made away from a solution. A rigorous stability analysis substantiates the existence of instability for certain common combinations of input values for this type of system.

Consider Equations 3 and 4, let $$\alpha_1 = a + \Delta\alpha$$

$$\beta_1 = \beta + \Delta\beta$$

then $$a \sin \alpha_1 - b \sin \beta_1 = E_1 \quad (5)$$

$$a \cos \alpha_1 + b \cos \beta_1 - c = E_2 \quad (6)$$

In Equation 5 a positive $E_1$ may be reduced to zero by diminishing $\alpha_1$ and/or increasing $\beta_1$. In Equation 6 a positive $E_2$ may be reduced to zero by increasing $\alpha_1$ and/or $\beta_1$. This may be written, For $E_1 \to 0$ $\alpha_1$ should change in a negative direction
$\beta_1$ should change in a positive direction For $E_2 \to 0$ $\alpha_1$ should change in a positive direction
$\beta_1$ should change in a positive direction If we allow $E_1$ to drive $\alpha_1$ in a negative direction and $E_2$ to drive $\alpha_1$ in a positive direction and if we allow $E_1$ and $E_2$ to drive $\beta_1$ in a positive direction then the requirements are met for reducing the error signals to zero, in accordance with the above analysis, and obtaining a simultaneous solution of the above two equations. These requirements may be met by building a computer such that $\alpha_1$ is driven responsive to $E_2 - E_1$ and $\beta_1$ is driven responsive to $E_1 + E_2$. The sign of the error signal is determined by the direction of the drive required or whether or not the function to be controlled in part by that error signal is to increase or decrease responsive thereto. Defining the resultant error signals as $R_1$ and $R_2$ respectively, $$R_1 = E_2 - E_1$$
$$R_2 = E_1 + E_2$$

it is readily apparent that when $E_1 = 0$ and $E_2 = 0$ then $R_1 = 0$ and $R_2 = 0$.

This method of combining error signals and then controlling the variable function generators accordingly provides correct operation as may be seen from the following further analysis. Assume that in Equation 5 the values of $\alpha_1$ and $\beta_1$ are such that $E_1$ is negative, and in Equation 6 $E_2$ is positive, then it may be seen that, For $(-E_1) \to 0$ $\alpha_1$ should change in a positive direction
$\beta_1$ should change in a negative direction For $(+E_2) \to 0$ $\alpha_1$ should change in a positive direction
$\beta_1$ should change in a positive direction Then the computer should be constructed such that $\alpha_1$ is driven responsive to $E_2 - E_1 = R_1$ and $\beta_1$ should be driven responsive to $E_2 - (-E_1) = E_2 + E_1 = R_2$.

Using a similar analysis for the situations where the error signals are $+E_1$ and $-E_2$, and $-E_1$ and $-E_2$, it will be seen that in the computer wherein $E_2 - E_1$ controls $\alpha$, and $E_2 + E_1$ controls $\beta_1$, a correct error signal combination control is provided for those situations.

In the computer, which is the embodiment of the present invention, the error voltages are combined and then fed back to drive or control the $\alpha$ and $\beta$ function generators. $E_2 - E_1$ is used to drive the $\alpha$ function generator and $E_1 + E_2$ is used to drive the $\beta$ function generator. The advantages of this system are that the computer always converges on a solution so that $\Delta\alpha$ and $\Delta\beta$ reach zero and the true solution for $\alpha$ and $\beta$ is provided.

In the event that $\Delta\alpha$ is zero, then the error signals $E_1$ and $E_2$ are caused by $\Delta\beta$. Since the drive tending to make $\Delta\alpha$ other than zero is a resultant of these two opposed signals, the resultant drive may be zero. If $\Delta\alpha$ is changed to a value other than zero, due to the resultant drive, there is an increase in the sum error signal. Thus $\Delta\beta$ is decreased more rapidly and the $\alpha$ function generator drive is such as to make $\Delta\alpha$ go to zero again. In the event that $\Delta\beta$ is zero, the error signals due to $\Delta\alpha$ may conceivably drive the $\beta$ function generator. The changed error signals, caused as a result, then serve to drive $\Delta\beta$ back to zero. It should be noted that in view of the combined error signal control the computer tends to simultaneously converge on a solution for the correct values of $\alpha$ and $\beta$. The actual embodiment of the present invention, which has a combined error voltage control in the above described manner, and a rigorous mathematical analysis both demonstrate a complete stability for all values of determinants presently applicable to the computer.

Referring now to Figure 2, there may be seen a schematic diagram showing an embodiment of the present invention. A unity voltage source applies unity voltage to three potentiometers 10, 12, 14 connected in parallel. Each potentiometer corresponds to a side of the triangle *a*, *b*, *c*. The potentiometer movable arms are each moved to a position so that their respective output voltages are proportional to the sides *a*, *b* and *c* of the triangle whose base angles $\alpha$ and $\beta$ are sought. The output of the "*a*" potentiometer 10 is applied to the rotor 18 of an angle resolver 16 having two stator windings 20, 22 which are in quadrature relationship with each other. In one of the stator windings, 20, there is induced a voltage proportional to $a \cos(\alpha + \Delta\alpha)$ where $(\alpha + \Delta\alpha)$ is the angle included between the rotor 18 and that stator winding 20. In the other stator winding 22 there is induced a voltage proportional to $a \sin(\alpha + \Delta\alpha)$.

A second angle resolver 26 is provided also having a rotor winding 28 and two stator windings 30, 32 in quadrature relationship with each other. The output of the "*b*" potentiometer 12 is applied to the rotor winding 28. A voltage proportional to $[b \cos(\beta + \Delta\beta)]$ is induced in the one of the stator windings 30 where the angle $(\beta + \Delta\beta)$ is the angle included between this stator winding 30 and the rotor winding 28. A voltage proportional to $[b \sin(\beta + \Delta\beta)]$ is induced in the other stator winding 32. The stator windings 20, 30 in which the voltages $[a \cos(\alpha + \Delta\alpha)]$ and $[b \cos(\beta + \Delta\beta)]$ are induced are connected together in series aiding fashion so that the voltages are additively combined. The combined stator windings 20, 30 are then connected to a high gain error voltage amplifier 34 through the output of the "*c*" potentiometer 14 in a manner so that the "*c*" potentiometer output voltage opposes the combined stator voltages. The resultant voltage, applied to the error voltage amplifier 34, is the error voltage $E_2$ as previously defined.

The stator windings 22, 32 in which the $[a \sin(\alpha + \Delta\alpha)]$ and $[b \sin(\beta + \Delta\beta)]$ voltages are induced are connected in series opposing fashion so that these voltages are subtracted from each other. The opposingly combined stator windings 22, 32 are then connected to another high gain error voltage amplifier 38. The input to this error amplifier 38 is therefore the error voltage $E_1$ as previously defined. Each of the error amplifier outputs is applied to a separate servo-motor 36, 40. These servo-motors are rotated at a speed dependent upon the amplitude of the applied signal and in a direction dependent upon the phase of the applied signal. The servo-motor 40 driven by the $E_1$ voltage has its shaft (represented by a dotted line) connected to two mechanical differentials 42, 44. The servo-motor 36 driven by the $E_2$ voltage also has its shaft (represented by a dotted line) connected to these two differentials 42, 44. However, one of the mechanical differentials 42 is arranged so that its output shaft (represented by a dotted line), which is connected to drive the first angle resolver rotor 18, is driven by the difference between the $E_2$ voltage responsive servo-motor shaft and the $E_1$ voltage responsive servo-motor shaft. The other one of the mechanical differentials 44 is arranged so that its output shaft, which is connected to drive the second angle resolver rotor 28, is driven by the sum of the two servo-motor shaft outputs. Effectively, therefore, the first angle resolver rotor 18 is driven responsive to $E_2 - E_1$ and the second angle resolver rotor 28 is driven responsive to $E_1 + E_2$.

When $E_1$ and $E_2$ equal zero the angles included between the first and second angle resolver rotor windings and stator windings in which the cosine voltages are induced equal the respective angles $\alpha$ and $\beta$, $\Delta\alpha$ and $\Delta\beta$ being equal to zero. The angle resolver rotor shafts may be calibrated, in well known fashion, to indicate the values of $\alpha$ and $\beta$ when the computer has converged on a solution.

Regardless of the initial position of the rotors of the angle resolvers, once a determinant set of values for *a*, *b* and *c* are applied, the computer operates automatically to position the angle resolvers at the correct values of $\alpha$ and $\beta$.

Figure 3 is a schematic diagram showing essentially the same structure as Figure 2 with parts having the same functions being given the same reference numerals. The difference is, however, that the error signals $E_1$ and $E_2$ are algebraically combined electrically before being applied to the error amplifiers and servo-motors and not mechanically thereafter. In this connection there is used hereinafter the term "sum resultant" and "difference resultant." By "sum resultant" is meant the resultant effect produced by summing the error voltages either directly by electrical means or by converting them into shaft rotations and then summing using a mechanical differential. The resultant effect may be used to control the angle resolver. By "difference resultant" is similarly meant the resultant effect, which may be used for control purposes, said effect occurring as a result of subtracting the error voltages directly electrically, or indirectly mechanically. The two transformers 46, 54 are used for the addition and subtraction of the error signals. Each transformer has two primary windings and a single secondary winding. For the angle resolver 16 used to find the angle $\alpha$, the $E_1$ and $E_2$ outputs from the respective combined stator windings 22, 32 are connected to the primary windings 48, 50 of one of the transformers 46 so that the voltage induced in the secondary 52 of the transformer is the resultant of $E_2 - E_1$. This transformer secondary 52 is connected to the input of the error voltage amplifier 38. The error voltage amplifier 38 is used to drive a servo-motor 40. The servo-motor shaft is connected, through suitable gearing (not shown), to drive the angle resolver rotor 18.

The error voltages $E_1$ and $E_2$ are also applied to the two primary windings 58, 60 of the other transformer 54 in a manner so that the voltage induced in the secondary winding 56 is equal to the resultant of $E_1$ and $E_2$. This resultant voltage is applied to the error signal amplifier 34 which has its output connected to drive the servo-motor 36 which drives the rotor 28 of the angle resolver 26 used to derive the angle $\beta$.

Although the embodiments of the present invention shown in Figs. 2 and 3 show an input voltage applied to the angle resolver rotors and sine and cosine voltages induced in the stators, this should not be taken as limiting since, from the well-known symmetry of an angle resolver, an input voltage may be applied to a stator winding and sine and cosine voltages may be induced in two rotary windings which are positioned in quadrature relation with each other. These output voltages may then be used in the same manner as described herein for the voltages induced in the stator windings.

The computer, which is the embodiment of the present invention, provides solutions which are values of $\alpha$ and $\beta$ lying between zero and 180 degrees. This is not due to any inherent limitation of the computer but is as yet a limitation of the information which is applied to the computer. The computer is capable of providing answers for the range from zero to 360 degrees. The determinants applied do not enable the computer to distinguish whether the angles are greater than 180 degrees and the answers furnished always lie between zero and 180 degrees. This is actually no limitation on the use of the computer since it merely requires the operator to know on which side of the base line *c* his triangle falls.

From the foregoing description, it will be readily apparent that a novel and stable simultaneous equation solver computer has been provided having a novel and improved error voltage control feedback system which affords more stability than obtainable heretofore. Although two embodiments of the present invention have been shown and described, it should be apparent that many changes may be made in the particular embodiments herein disclosed, and that many other embodiments are possible, all within the spirit and scope of the invention. It is therefore desired that the foregoing description shall be taken as illustrative and not as limiting.

What is claimed is:

1. In a simultaneous equation solver of the type wherein a function generator assigned to each simultaneous equation generates outputs responsive to known value inputs which outputs are then combined to provide a resultant error signal for each equation, the improvement therein comprising a plurality of means for combining said resultant error signals to provide a plurality of combined error signals, and means for each function generator responsive to and upon which are impressed said combined error signals, to control said respective function generators to reduce said resultant error signals toward zero.

2. In a simultaneous equation solver for solving equations of the type, $$a \sin \alpha - b \sin \beta = 0$$
$$a \cos \alpha + b \cos \beta - c = 0$$

wherein there is a function generator for each equation to generate outputs responsive to known value inputs which outputs are then combined to provide a resultant error signal for each equation, the improvement therein comprising a (1) means for algebraically combining said resultant error signals to provide combined error signals, and a means for each function generator upon which said combined error signals are impressed to control said respective function generators in response to said combined error signals to reduce said resultant error signals toward zero.

3. In a simultaneous equation solver for solving equations of the type, $$a \sin \alpha - b \sin \beta = 0$$
$$a \cos \alpha + b \cos \beta - c = 0$$

wherein *a*, *b* and *c* are known values and *a* and *b* are respectively applied to a first and a second function generator which generates outputs responsive thereto which are combined in a manner indicated by the equations to provide an error signal for each equation, the improvement therein which comprises (1) means to combine said error signals by opposing one of said error signals with the other, (2) means upon which said combined opposed error signals are impressed to control said first function generator, (3) means for combining said error signals in aiding relationship, and (4) means upon which said last-mentioned combined error signals are impressed to control said second function generator, both said control means serving to control said function generators in a manner to reduce said resultant error signals to substantially zero.

4. A system for solving simultaneous equations of the type, $$a \sin \alpha - b \sin \beta = 0$$
$$a \cos \alpha + b \cos \beta - c = 0$$

where *a*, *b* and *c* are known quantities respectively represented by first, second and third representative voltages and $\alpha$ and $\beta$ are unknown angles, said system comprising a first angle resolver and a second angle resolver each having rotor windings and stator windings, means to impress said first representative voltage upon a winding of said first angle resolver to generate a first function voltage proportional to a cosine $(\alpha + \Delta\alpha)$ and a second function voltage proportional to a sin $(\alpha + \Delta\alpha)$ where $(\alpha + \Delta\alpha)$ is the angle made by the winding of said first angle resolver upon which said first representative voltage is impressed referred to the winding in which said first function voltage is generated, means to impress said second representative voltage upon a winding of said second angle resolver to generate a third function voltage proportional to $b \cos (\beta + \Delta\beta)$ and a fourth function voltage proportional to $b$ sin $(\beta+\Delta\beta)$, where $(\beta+\Delta\beta)$ is the angle made by the winding of said second angle resolver upon which said second representative voltage is impressed referred to the winding in which said third function voltage is generated, means to opposingly connect said second function voltage and said fourth function voltage to obtain a resultant first error voltage, means to opposingly connect said third representative voltage and said first and third function voltages to obtain a resultant second error voltage, means to control said first angle resolver responsive to the difference of said two error voltages to reduce $\Delta\alpha$ to zero, and means to control said second angle-resolver responsive to the sum of said two error voltages to reduce $\Delta\beta$ to zero, whereby the respective angles made by the windings of said first and second angle resolvers upon which said first and second representative voltages are impressed referred to said windings in which said first and third function voltages are generated are respectively equal to $\alpha$ and $\beta$.

5. A system for computing two angles of a triangle from information as to the lengths of the first, second and third sides of said triangle respectively expressed as first, second and third representative voltages, said system comprising a first means upon which said first voltage is impressed to generate a first product voltage proportional to the product of the first side of said triangle and the cosine of the first angle and a second product voltage proportional to the product of said first side and the sine of said first angle, a second means upon which said second representative voltage is impressed to generate a third product voltage proportional to the product of the second side of said triangle and the cosine of a second angle and a fourth product voltage proportional to the product of said second side and the sine of said second angle, means to opposingly connect said first product voltage with said third product voltage to provide a resultant first error voltage, means to opposingly connect said third representative voltage with said second and said fourth product voltages to produce a resultant second error voltage, means to oppose said error voltages to provide a difference resultant, means to combine said error voltages to provide a sum resultant, means to control said first product voltage generating means responsive to said difference resultant to vary said generated first and second product voltages, and means to control said second product voltage generating means responsive to said sum resultant to vary said generated third and fourth product voltages whereby when said product voltages have values such that said first and second error voltages are zero said first angle is equal to the angle in said triangle included between said first and third side and said second angle is equal to the angle in said triangle included between said second and third sides.

6. A system for computing two angles of a triangle from information as to the lengths of the first, second and third sides of said triangle respectively expressed as first, second and third representative voltages, said system comprising a first and second angle resolver each having first and second stator windings in quadrature relationship with each other and a rotor winding, means to impress said first representative voltage upon said first angle resolver rotor winding to induce voltages in its stator windings, said first stator winding voltage being proportional to the product of the first side of said triangle and the cosine of the angle made by the rotor referred to said first resolver first stator winding, said second stator winding voltage being proportional to the product of the first side of said triangle and the sine of said last mentioned angle, means to impress said second representative voltage upon said second angle resolver rotor winding to induce voltages in said second angle resolver first and second stator windings, said second resolver first stator winding voltage being proportional to the product of said second side of said triangle and the cosine of the angle made by said second angle resolver rotor winding referred to said second angle resolver first stator winding, said second resolver second stator winding voltage being proportional to the product of said second side of said triangle and the sine of said last named angle, means to opposingly connect both said second stator voltages against each other to obtain a resultant first error voltage, means to combine in aiding relationship both said first stator voltages, means to opposingly connect said combined first stator voltages with said third representative voltage to obtain a resultant second error voltage, means to oppose said first and second error voltages to provide a difference resultant, means to add said error voltages to provide a sum resultant, means to rotate said first angle resolver rotor winding responsive to said difference resultant, and means to rotate said second angle resolver rotor winding responsive to said sum resultant whereby said rotor windings are rotated to a position wherein said error voltages equal zero and the said angles made by said first and second angle resolver rotor windings referred to their respective first stators are respectively proportional to the angles included between the first and third and second and third sides of said triangle.

7. A system for computing two angles of a triangle from information as to the lengths of the first, second and third sides of said triangle respectively expressed as first, second and third representative voltages, said system comprising a first and a second angle resolver each having first and second stator windings in quadrature relationship with each other and a rotor winding, means to impress said first representative voltage upon said first angle resolver rotor winding to induce voltages in its stator windings, said first stator winding voltage being proportional to the product of the first side of said triangle and the cosine of the angle made by said rotor winding referred to said first stator winding, said second stator winding voltage being proportional to the product of said first side of said triangle and the sine of said last named angle, means to impress said second representative voltage upon said second angle resolver rotor winding to induce voltages in said second angle resolver first and second stator windings, said last named first stator winding voltage being proportional to the product of said second side of said triangle and the cosine of the angle made by said second angle resolver rotor winding referred to said second angle resolver first stator winding, said last named second stator winding voltage being proportional to the product of said second side of said triangle and the sine of said last named angle, means to opposingly connect both said second stator voltages to obtain a resultant first error voltage, means to combine both first stator voltages, means to opposingly connect said combined voltages with said third representative voltage to obtain a resultant second error voltage, a first servo motor, means to impress said first error voltage upon said first servo motor, a second servo-motor, means to impress said second error voltage upon said second servo-motor, first mechanical differential means connected to said first and second servo-motor shafts to provide an output shaft position equal to the difference of said input shaft positions, means connecting said first mechanical differential means output to said first angle resolver rotor, second mechanical differential means connected to said first and second servo motor shafts to provide an output shaft position equal to the sum of said input shaft position, means connecting said second mechanical differential means output to said second angle resolver rotor whereby said first and second angle resolver rotors are rotated by said mechanical differential means outputs until said first and second error signals are reduced to substantially zero whereupon the angles of said first and second angle resolver rotors respectively referred to their first stators are respectively proportional to the values of the angles included between said first and third and second and third sides in said triangle.

8. In the equation solver as claimed in claim 1, said means for combining said resultant error signals each comprising a mechanical differential.

9. In the equation solver as claimed in claim 8, said means for each function generator responsive to and upon which are impressed said combined error signals comprising a mechanical connection between each function generator and one of said mechanical differentials individual to the generator to which it is connected.

10. In the equation solver as claimed in claim 1, said means for combining said resultant error signals each comprising electrical combining means.

11. In the equation solver as claimed in claim 10, said electrical combining means each comprising a transformer.

References Cited in the file of this patent

UNITED STATES PATENTS

| | | |
|---|---|---|
| 2,401,447 | Wipff | June 4, 1946 |
| 2,433,237 | Rajchman | Dec. 23, 1947 |
| 2,465,624 | Agins | Mar. 29, 1949 |
| 2,475,314 | Dehmel | July 5, 1949 |

FOREIGN PATENTS

| | | |
|---|---|---|
| 508,892 | France | Aug. 15, 1920 |
| 599,309 | Great Britain | Mar. 10, 1948 |
| 607,397 | Great Britain | Aug. 30, 1948 |
| 615,480 | Great Britain | Jan. 6, 1949 |